US006426314B1

(12) United States Patent
Carroll et al.

(10) Patent No.: US 6,426,314 B1
(45) Date of Patent: Jul. 30, 2002

(54) HYDROGEN SCAVENGERS

(75) Inventors: David W. Carroll, Los Alamos; Kenneth V. Salazar, Espanola; Mitchell Trkula; Cynthia W. Sandoval, both of Los Alamos, all of NM (US)

(73) Assignee: The Regents of the University of California, Los Alamos, NM (US)

( * ) Notice: Subject to any disclaimer, the term of this patent is extended or adjusted under 35 U.S.C. 154(b) by 0 days.

(21) Appl. No.: 09/872,220

(22) Filed: May 31, 2001

Related U.S. Application Data (60) Provisional application No. 60/225,523, filed on Aug. 15, 2000.

(51) Int. Cl.[7] .............................. H01J 7/18; B01J 20/22; B01J 20/30; B01J 20/32; B01J 31/00
(52) U.S. Cl. ..................... 502/150; 502/103; 502/104; 502/108; 502/114; 502/115; 502/117; 502/152; 502/401; 252/181.1; 252/181.3; 252/181.4; 252/181.6; 252/181.7
(58) Field of Search ................... 252/181.1, 181.3, 252/181.4, 181.6, 181.7; 502/103, 104, 108, 114, 115, 117, 401, 150, 152

(56) References Cited

U.S. PATENT DOCUMENTS

| 4,405,487 A | 9/1983 | Harrah et al. ............... 252/194 |
| 4,755,567 A | 7/1988 | Bierschenk et al. ......... 525/409 |

OTHER PUBLICATIONS

Carroll, David W., Kenneth V. Salazar, Mitchell Trkula, David R. Pesiri, Cynthia W. Sandoval, and Jonathan A. Rau, "CVD/PVD Co–deposition of the DEB/Palladium Hydrogen Getter System," paper presented at the 15th Symposium on Chemical Vapor Deposition 197th Meeting of the Electrochemical Society, May 14–19, 2000, Toronto, Ontario, Canada.

An abstract of the paper presented in Item 1 was posted on the Electrochemical Society website the first week of Feb., 2000, less than a year prior to the filing of the provisional application.

Carroll, David W., David R. Pesiri, Kenneth V. Salazar, Mitchell Trkula, Jonathan A. Rau, and Cynthia W. Sandoval, a poster and overhead projector slide presentation given at the Electrochemical Society meeting held in Mar. 2001 at Washington, D. C..

*Primary Examiner*—Elizabeth D. Wood
(74) *Attorney, Agent, or Firm*—Gemma Morrison Bennett (57) ABSTRACT

There has been invented a codeposition process for fabricating hydrogen scavengers. First, a π-bonded allylic organometallic complex is prepared by reacting an allylic transition metal halide with an organic ligand complexed with an alkali metal; and then, in a second step, a vapor of the π-bonded allylic organometallic complex is combined with the vapor of an acetylenic compound, irradiated with UV light, and codeposited on a substrate.

39 Claims, 5 Drawing Sheets

HYDROGEN SCAVENGERS

This application claims the benefit of U.S. Provisional Application No. 60/225,523, filed Aug. 15, 2000.

This invention was made with government support under Contract No. W-7405-ENG-36 awarded by the U.S. Department of Energy. The government has certain rights in the invention.

TECHNICAL FIELD

This invention relates to a codeposition process for making hydrogen scavengers.

BACKGROUND ART

Hydrogen scavengers are useful when materials such as those in propellant systems or electronic components must be protected from the deleterious effects of exposure to hydrogen. There have previously been developed hydrogen scavengers which are a combination of an acetylenic organic material with a supported metal catalyst. Traditional preparation of such scavengers is accomplished by mixing a solid organic component with a solid metal catalyst in a ball mill process followed by grinding and pelletizing. The resulting scavenger material is typically placed into support tubes or other suitable containers. Such scavengers are useful as a bulk scavenger material when placed in proximity to an article to be protected from gaseous hydrogen. However, they do not ensure adequate protection of the article because they do not coat the article itself or otherwise act as a barrier between the article and hydrogen gas that may be present in the vicinity of the article.

Consequently, there is a need for hydrogen scavengers which can be deposited as coatings over large surface areas, onto complex shapes, or infiltrated into porous structures to function as both a scavenger and barrier.

It is therefore an object of this invention to provide hydrogen scavengers which can be applied to large, complex or porous surfaces and a simple, effective method of making the hydrogen scavengers.

It is another object of this invention to provide hydrogen scavengers which can be placed into proximity with the source of the hydrogen to be scavenged.

It is a further object of this invention to provide a codeposition process for making hydrogen scavengers.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims. The claims appended hereto are intended to cover all changes and modifications within the spirit and scope thereof.

DISCLOSURE OF INVENTION

To achieve the foregoing and other objects, and in accordance with the purposes of the present invention, as embodied and broadly described herein, there has been invented a codeposition process for fabricating hydrogen scavengers. First, a π-bonded allylic organometallic complex is prepared by reacting an allylic transition metal halide with an organic ligand complexed with an alkali metal; and then, in a second step, a vapor of the π-bonded allylic organometallic complex is combined with the vapor of an acetylenic compound, irradiated with UV light, and codeposited on a substrate. The invention process more particularly comprises:

1. combining an allylic transition metal halide with an anhydrous solvent to form a suspension;
2. combining said suspension with an alkali metal complexed with an organic ligand to obtain a reaction mixture having therein a π-bonded allylic organometallic complex and an alkaline earth halide;
3. isolating said π-bonded allylic organometallic complex from said reaction mixture;
4. vaporizing said π-bonded allylic organometallic complex to form a π-bonded allylic organometallic complex vapor;
5. vaporizing an acetylenic compound to form an acetylenic compound vapor;
6. combining said π-bonded allylic organometallic complex vapor with said acetylenic compound vapor to form a vapor mixture;
7. irradiating said vapor mixture with UV light energy to form a mixture of said acetylenic compound vapor and a disassociated π-bonded allylic organometallic complex vapor; and
8. allowing said mixture of said acetylenic compound vapor and said disassociated π-bonded allylic organometallic complex to condense upon a substrate.

BRIEF DESCRIPTION OF THE DRAWINGS

The accompanying drawings, which are incorporated in and form a part of the specification, illustrate embodiments of the present invention and, together with the description, serve to explain the principles of the invention. In the drawings.

BEST MODES FOR CARRYING OUT THE INVENTION

The present invention provides a novel process for codeposition of hydrogen scavenger materials onto planar or complex surfaces including surfaces of particles of particulate materials, other surfaces having complex shapes or into porous materials. In the two-step invention process, a π-bonded allylic organometallic complex is prepared and then, in a second step, a vapor of the π-bonded allylic organometallic complex is combined with the vapor of an acetylenic compound, and contacted with UV light energy to form a mixture of the acetylenic compound vapor and a disassociated π-bonded allylic organometallic complex vapor. The mixture of the acetylenic compound vapor and a disassociated π-bonded allylic organometallic complex vapor is then applied to a substrate by codeposition.

Figure 1:
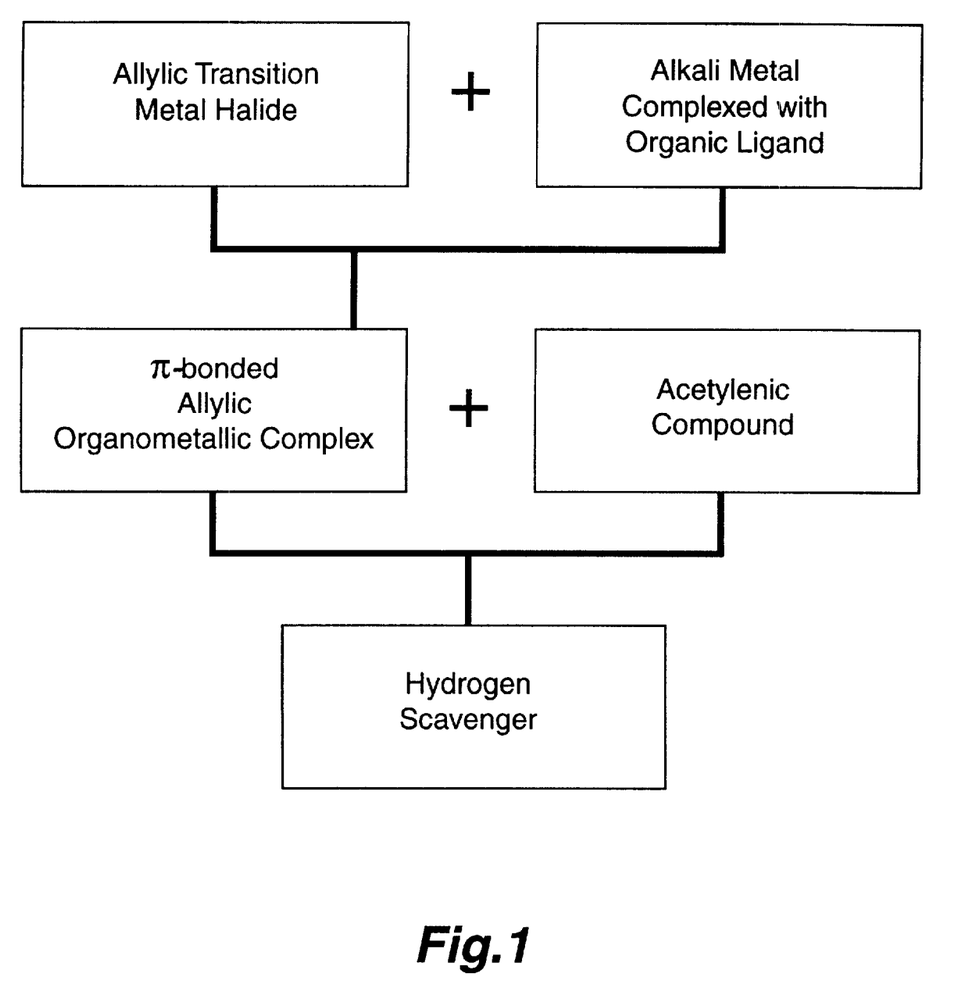
FIG. 1 is a flowchart of the chemical process.

FIG. 1 is a flowchart showing the steps of the basic invention process.

The π-bonded allylic organometallic complex can be prepared by any suitable method. In one presently preferred method an allylic transition metal halide is first combined with any suitable anhydrous solvent such as benzene, toluene, or cyclohexane to form a suspension of the allylic transition metal halide.

Allylic transition metal halides which are useful in the practice of the invention are those which will form π-bonded allylic organometallic complexes when combined with an alkali metal such as lithium, sodium or potassium complexed with an organic ligand to form a π-bonded allylic organometallic complex which will dissociate when contacted in vapor form by UV light. Generally, allylic transition metal halides which are presently preferred include, but are not limited to, dimeric allylpalladium chloride, allytitanium chloride and allylnickel chloride. Presently most preferred is dimeric allylpalladium chloride because it is readily available from commercial sources.

The concentration of the allylic transition metal halide suspension must be sufficient to produce the desired quantity of the π-bonded allylic organometallic complex by stoichiometrically combining with the selected alkali metal complexed with an organic ligand. Generally, a concentration in the range from about 0.5 molar to about 2.0 molar is useful in the practice of the invention, depending upon the concentration and amount of π-bonded allylic organometallic complex to be used.

Then an alkali metal complexed with an organic ligand is combined with the allylic metal halide suspension, generally by stirring sequential additions of an anhydrous suspension of the alkali metal complex into the allylic metal halide suspension under an inert atmosphere. Again, any suitable anhydrous solvent such as benzene, toluene, or cyclohexane can be used. The inert atmosphere can be any inert gas such as argon, helium, neon, or nitrogen.

Alkali metals complexed with organic ligands which are useful in the practice of the invention are those which will form π-bonded complexes with the allylic transition metal halides. The alkali metal can be lithium, sodium, potassium, or cesium.

The organic ligand can be any that will form a πbond with the alikali metal. Generally, unsaturated ring compounds with four to eight carbons or unsaturated carbon chains of three to seven carbons are useful as organic ligands. Carbon chains short enough to stay in a gaseous state when dissociated by the UV are needed. Presently preferred are compounds selected from the group of cyclobutadiene, cyclopentadiene, 1,3-cyclohexadiene, cycloheptene, propene and butene.

The alkali metal can be complexed with the organic ligand by any suitable method known in the art, such as by displacement reaction wherein the halogen in an alkyl halide is replaced by another group or by reaction of an alkyl halide with a metal. Alkali metals already complexed with organic ligands are also available commercially and can be used in the invention.

Generally, alkali metal complexes which are presently preferred include, but are not limited to, cyclopentadienyl-lithium, allyl-lithium, sodium cyclopentadienyl, allyl-sodium, potassium cyclopentadienyl, and allyl-potassium. Presently most preferred is cyclopentadienyl-lithium because it is readily commercially available.

The concentration of the alkali metal complex suspension must be sufficient to provide a 2:1 molar ratio with the allylic transition metal halide. Generally, a concentration in the range from about 1.0 molar to about 4.0 molar is useful in the practice of the invention, depending upon the concentration and amount of allylic transition metal halide used.

An amount of π-bonded allylic organometallic complex sufficient to stoichiometrically combine with the acetylenic compound vapor is needed. An amount in the range from about 10 to about 50 weight percent based upon total weight of π-bonded allylic organometallic complex and acetylenic compound is generally useful in the invention. More preferable is an amount in the range from about 20 to about 30 weight percent based upon total weight of π-bonded allylic organometallic complex and acetylenic compound. Generally presently preferred, if using dimeric allylpalladium chloride, is about 25 weight percent π-bonded allylic organometallic complex containing about 5 weight percent palladium based upon total weight of carbon and palladium. Use of too little π-bonded allylic organometallic complex will result in an insufficient stoichiometric ratio of metal catalyst to acetylenic organic material and therefore reduce uptake of hydrogen. Use of too much π-bonded allylic organometallic complex likewise will cause an insufficient stoichiometric ratio of acetylenic organic material to metal catalyst and therefore reduce uptake of hydrogen by the scavenger.

The π-bonded organometallic complex is vaporized by any suitable means such as by sublimation or by mechanical transport of the suspension by entraining it as a finely-divided powder having less than 1 micron diameter particle size in a gas stream. Presently preferred is sublimation of the solid by heating it to a temperature slightly below the melting point in a chemical vapor deposition vessel at a pressure in the range from about $1\times10^{-4}$ Torr to atmospheric pressure while an inert gas is being bubbled through the heated powder. Generally, depending upon the vapor pressure of the π-bonded allylic organometallic complex, a pressure of about 10 Torr is most useful in the invention because it provides efficient and cost-effective transport of the vapor.

The π-bonded allylic organometallic complex vapor is combined with a vapor of an acetylenic compound to form a mixture of vapors.

Acetylenic organic compounds which are useful in the practice of the invention are those which contain unsaturated carbon-carbon triple bonds bonded to one or more unsaturated aromatic rings and which will not dissociate when contacted with the UV light. Generally acetylenic organic materials which are presently preferred include, but are not limited to, 1,4-bis(phenylethynyl)benzene (DEB), 1,4-diphenylbutadiyne (PB), 1,3-diphenoxybenzene (DPPE), tolyl, xylyl, mesityl, phenyethyl, methylphenylethyl, napthyl, and biphenyl. Presently most preferred is 1,4-bis(phenylethynyl)benzene (DEB) because it is immune to damage from UV radiation, is commercially available and easily handled.

An amount of acetylenic organic material sufficient to stoichiometrically combine with the π-bonded allylic organometallic complex is needed. An amount in the range from about 50 to about 90 weight percent based upon total weight of π-bonded allylic organometallic complex and acetylenic compound is generally useful in the invention. More preferable is an amount of acetylenic organic material in the range from about 60 to about 80 weight percent based upon total weight of π-bonded allylic organometallic complex and acetylenic compound. Generally presently preferred is an amount of acetylenic organic material in the range from about 65 to about 85 weight percent based upon total weight of π-bonded allylic organometallic complex and acetylenic compound. Use of too little acetylenic organic material will result in an excess of unreacted π-bonded allylic organometallic complex. Use of too much acetylenic organic material will result in an excess of unreacted acetylenic organic material. Either of these conditions can result in reduced hydrogen uptake efficiency.

The acetylenic compound to be combined with the π-bonded allylic organometallic complex vapor is vaporized by any suitable means such as sublimation in a bubbler or an oil bath at an elevated temperature slightly below the melting point of the acetylenic compound. Presently preferred is sublimation of the solid by heating it to a temperature slightly below the melting point in a chemical vapor deposition vessel at a pressure in the range from about $1\times10^{-4}$ Torr to atmospheric pressure while an inert gas is being bubbled through the heated powder. Generally, depending upon the vapor pressure of the acetylenic compound, a pressure of about 10 Torr is most useful in the invention because it provides efficient and cost-effective transport of the vapor.

The vapors of the suspension of allylic transition metal complexed with a π-bonded allylic organometallic complex and of the acetylenic compound solution are combined by any suitable chemical vapor mixing method. One presently preferred method of combining the two vapors is to bubble an inert gas through a bubbler containing the suspension of π-bonded allylic organometallic complex and also through a bubbler containing the acetylenic compound solution while maintaining each of the bubblers at an elevated temperature slightly below the melting points of the π-bonded allylic organometallic complex and the acetylenic compound. The laden inert carrier gases are then conducted into a common manifold to form a mixture of the two gases carrying the vapors.

The mixture of vapors in the carrier gas are then delivered to a deposition chamber where the mixture of vapors is irradiated with UV light energy to form a mixture of the acetylenic compound vapor and a disassociated ir-bonded allylic organometallic complex vapor. This deposition chamber will generally be a vacuum chamber to provide an unobstructed environment free of gases not associated with the invention process so that the invention gases can move unimpeded to the substrate of choice also located within the deposition chamber.

Flow rates of the acetylenic compound and the π-bonded allylic organometallic complex into the deposition chamber can be anywhere within a broad range from about 5 sccm to about 8000 sccm each. Generally presently preferred for acetylenic compounds such as 1,4-bis(phenylethynyl) benzene is a flow rate of acetylenic compound and inert gas in the range from about 50 sccm to about 150 sccm and for π-bonded allylic organometallic complexes such as allylcyclopentadienylpalladium and inert gas in the range from about 150 sccm to about 250 sccm.

UV light energy in the range from about 200 nm to about 280 nm wavelengths can be used in practice of the invention, depending upon the optical properties of the π-bonded allylic organometallic complex. Presently preferred is a wavelength of 254 nm for disassociating allylcyclopentadienylpalladium.

Presently preferred is a UV light source which can operate at standard voltage and amperage and which produces a wavelength effective for dissociating the selected π-bonded allylic organometallic complex.

If a transparent quartz reaction chamber or a deposition chamber with a quartz window is used, the UW light source can be located external to the deposition chamber so that the UV light is directed through the wall and onto the gas mixture and substrate over a distance from the UV lamp to the center of the chamber. Depending upon the scale of the process and the size of the deposition chamber, the UV light source can be anywhere from almost touching the outer wall of the deposition chamber to a distance of about 10 feet. A distance of about 2 inches from the deposition chamber is generally presently preferred standard laboratory quartz bell jars.

Alternatively, the UV lamp is located inside the deposition chamber with protection of the UV light source from the codeposition process provided use of a leaf-type or continuous film shutter.

The vapor mixture of the acetylenic compound and the π-bonded allylic organometallic complex generally is irradiated in the deposition chamber with a continuous or pulsed beam of the UV light for the duration of the time the substrate is being irradiated with the vapor. However, because the π-bonded allylic organometallic complex stays disassociated once it has been disassociated by irradiation with the UV light, intermittant irradiation with the UV light can be used for such applications as formation of very thin layers of scavenger or for forming layers of scavenger that will be interleaved with layers of other materials. Generally, a length of time in the range from about 1 minute to about 8 days is needed depending upon the rate of deposition, the concentration of the vapors and the thickness of layer of hydrogen scavenger desired. Longer time periods of several days may be needed when it is desired to slowly codeposit the scavenger layer on a complex surface or infiltrate it into a complex surface such as that of a foam or sponge. However, from about one-half hour to about five hours is generally a sufficient time to codeposit an adequate layer of scavenger material on most surfaces.

The article to be protected from exposure to hydrogen can be the substrate with a coating of the invention scavenger material applied directly to the surface of the article to be protected. Alternatively, a separate scavenger which can be placed in contact with or proximate to the article to be protected can be made by coating a substrate other than the article to be protected with the invention scavenger material. Almost any material can be used as the substrate for the codeposition. Substrates which can be used in the practice of the invention include, but are not limited to, metals, glasses, ceramics, and polymers.

The substrates can have surfaces with simple or complex geometries or can be surfaces of particulates or porous structures such as foams or woven fabrics. The substrates can be within a large range of sizes, ranging from submillimeter sizes to several square meters, depending upon the scale of the codeposition system and the size of the reaction chamber.

It is believed that the vapors disassociate into elemental metal and carbon and straight chain and/or cyclic hydrocarbons that are usually in the gaseous state. The disassociated π-bonded allylic organometallic complex and the acetylenic compound codeposit or condense onto or into the substrate as a layer of elemental metal and carbon interspersed in an unsaturated hydrocarbon environment.

The invention codeposition step in the deposition chamber can be carried out at a pressure in the range from $1\times10^{-4}$ Torr to about ambient atmospheric pressure. Atmospheric pressure is presently preferred.

The codeposition step of the invention can be carried out at any temperature in the range from about −50° C. to about 150° C. Generally, using the vapors given herein as being presently preferred, ambient temperature is presently preferred, depending upon desired film thickness and deposition rate.

Layers of scavenger material anywhere from about 200 angstroms to 2000 microns can be formed on substrates using the invention process.

Figure 2:
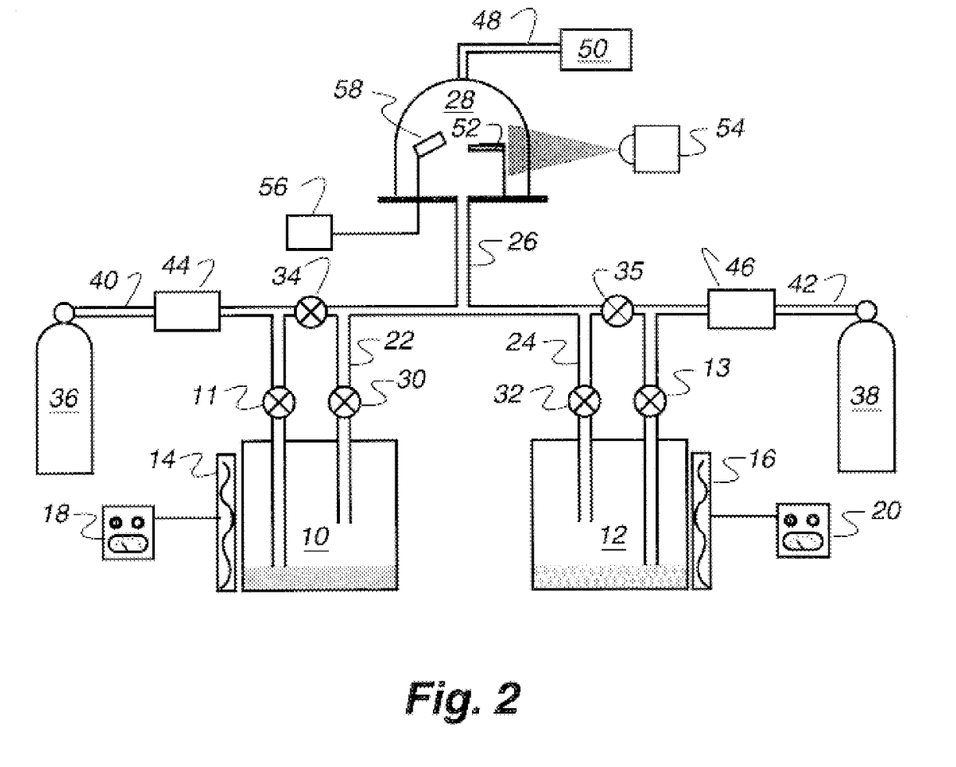
FIG. 2 is a schematic of a setup for making the invention hydrogen scavengers.

The invention process is typically carried out in an apparatus such as that shown in the schematic of FIG. 2.

The acetylenic compound is supplied to a bubbler reactor 10 and the π-bonded allylic organometallic complex is supplied to a second bubbler reactor 12. Each of the bubbler reactors 10 and 12 has connected therewith a heater device 14 and 16 and a temperature controller 18 and 20.

A first conduit 22 and a second conduit 24 allow vapors from each of the bubbler reactors 10 and 12 to be mixed in a single third conduit 26 connected so as to transport the mixture of vapors into a deposition chamber 28. Valves 30, 32 and 34 for controlling the flow of vapor are in the first, second and third conduits 22, 24, and 26 as needed for achieving the selected stoichiometric mixture of the vapors.

Two separate containers 36 and 38 for inert carrier gas are connected by means of a fourth and a fifth conduit 40 and 42 with the first and second bubbler reactors 10 and 12. Each of the fourth and fifth conduits 40 and 42 can have therein a mass flow controller 44 and 46 or some other appropriate valve device for controlling flow of the inert carrier gas into the bubbler reactors at a level below the level of acetylenic compound or π-bonded allylic organometallic complex, as the case may be.

The deposition chamber 28 is equipped with exhaust conduit 48 and exhaust pump, throttle valve and pressure control mechanisms 50 as needed.

The substrate 52 is placed or secured in the deposition chamber 28 and positioned with respect to a UV light source 54 such that the mixture of vapors is irradiated in the deposition chamber 28 by UV light energy from the UV light source 54 which can be placed either outside a deposition chamber through which the light can be directed or which can be placed inside the deposition chamber. The UV light energy is directed to the space just above the surface or surfaces of the substrate 52 to be coated with a layer of the codeposited hydrogen scavenger material.

If desired, one or more devices 56 can be connected with the deposition chamber 28 with sensors 58 within the deposition chamber 28 for detecting such things as the thickness of the layer of scavenger being codeposited. A typical example might be a quartz thickness monitor.

Hydrogen scavengers made in accordance with this invention can be stored for an unlimited length of time by storing them under inert gas, or in a vacuum, or simply in impermeable sealed containers.

The invention process is simple, can be carried out at ambient temperatures and pressures, and results in a hydrogen scavenger which forms a scalable coating on any of a wide variety of substrates.

Depending upon the components used in the hydrogen scavengers of this invention, the hydrogen scavenging reaction is not reversible.

The vapor-phase codeposition process of this invention can be used for synthesis of new scavengers. Since the codeposition is based on a vapor-phase process, other constituents such as dessicants to create a multipurpose scavenger can be added.

Novel applications of new and existing gas scavengers, such as for coverage of thin layers of scavenger over large surface areas and the infiltration of scavengers into porous or woven materials are possible with the invention process.

The following example will demonstrate the operability of the invention.

EXAMPLE

A hydrogen scavenger was made by codeposition of 1,4-bis(phenylethynyl) benzene, carbon and palladium onto a porous substrate using an equipment setup essentially similar to that shown in FIG. 2.

About 20 $cm^3$ of allylcyclopentadienylpalladium which had been synthesized in accordance with the methods described by McClellan et al., 1961) was introduced into a first bubbler reactor with a volume of 100 $cm^3$ which had been swept with argon.

The first bubbler reactor and its contents were heated to 45° C. at 10 Torr pressure.

Approximately 30 $cm^3$ of 1,4-bis(phenyethynyl) benzene, commercially available from Kemex Laboratories, P.O. Box 245, Painesville, Ohio. 44077, was loaded into a second bubbler with a volume of 100 $cm^3$ which had been swept with argon. The 1,4-bis(phenylethynyl) benzene was a solid crystalline powder, light yellow in color.

The 1,4-bis(phenylethynyl) benzene was sublimed by heating the second bubbler to 130° C. at 10 Torr pressure.

The temperatures and pressures of each of the bubbler reactors was maintained throughout the codeposition process.

The allylcyclopentadienylpalladium was conducted from the first bubbler reactor and the 1,4-bis(phenylethynyl) benzene was conducted from the second bubbler reactor simultaneously by bubbling argon through each of the reactors and into a common conduit which then contained a mixture of the vapors.

Argon was simultaneously flowed through the first bubbler reactor containing the subliming 1,4-bis(phenylethynyl) benzene at a rate of 200 sccm and through the second bubbler reactor containing the subliming allylcyclopentadienylpalladium at a rate of 95 sccm.

The mixture of vapors was transported by the argon into a standard laboratory quartz bell jar 10 cm in diameter and 25 cm high. The quartz bell jar was equipped with an inlet, substrate holder (stage), quartz thickness monitor, an outlet, and a device for holding a UV lamp against the outside of the quartz bell jar wall.

The substrate was a 2 inch by 3 inch silicon rubber foam about 0.125 inch thick. The substrate was secured within the vacuum chamber on the stage using spring-loaded clips.

The UV light source was a UVP, Inc. Model R52G UV lamp, 115 volts, 0.90 amps with a nominal wavelength of 254 nm.

It is believed that the allylcyclopentadienylpalladium dissociated into palladium particles approximately 0.5 micron in diameter, carbon, propane and cyclopentane and that the 1,4-bis(phenylethynyl) benzene vapor did not dissociate. Irradiation of the mixture of vapors was begun a minute or two before introduction of the vapors into the quartz bell jar and continued for a period of about 2 hours.

The mixture of the dissociated allylcyclopentadienylpalladium and sublimed 1,4-bis(phenylethynyl) benzene was allowed to condense onto the surface of the substrate for the irradiation period of about 2 hours to form a homogeneous codeposited layer on the substrate. The layer of scavenger formed was about 25 microns thick and evenly distributed.

Figure 3A:
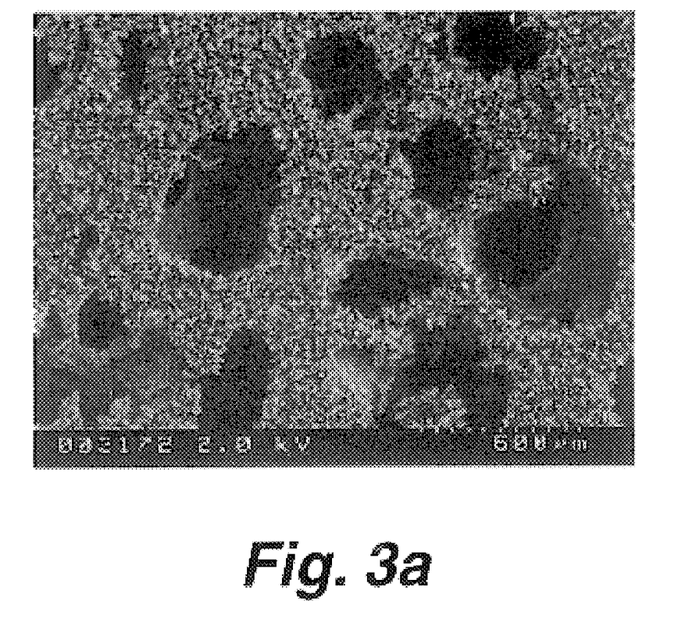
FIGS. 3a and 3b are scanning electron micrographs, with 600 and 30 micron markers respectively, showing size and morphology of a codeposit made in accordance with the invention.
Figure 3B:
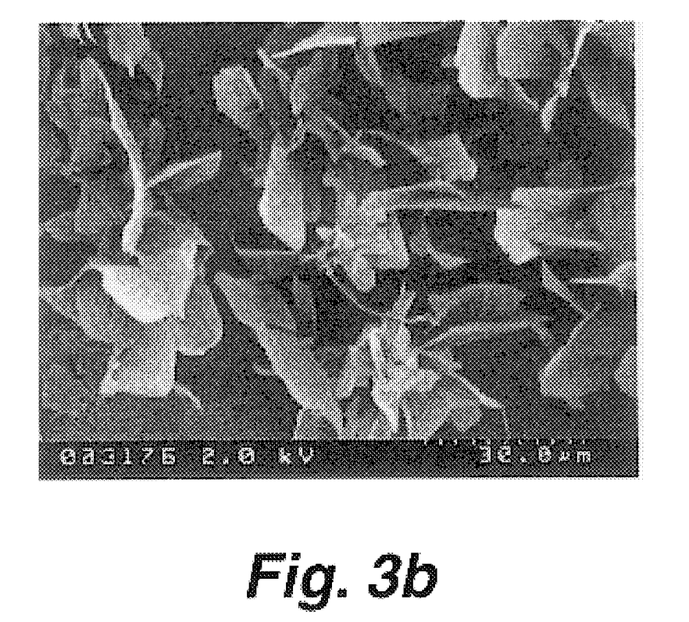

FIGS. 3a and 3b are scanning electron micrographs of the scavenger layer formed in the process of this example, with 600 and 30 micron markers respectively, showing size and morphology of the codeposited layer. The morphology of the codeposit, which was a platelet microstructure of high surface area, is considered advantageous for gas-solid interactions.

$H^1$ NMR was used to demonstrate that the codeposited layer functioned as a hydrogen scavenger. The following comparisons were made.

Figure 4A:
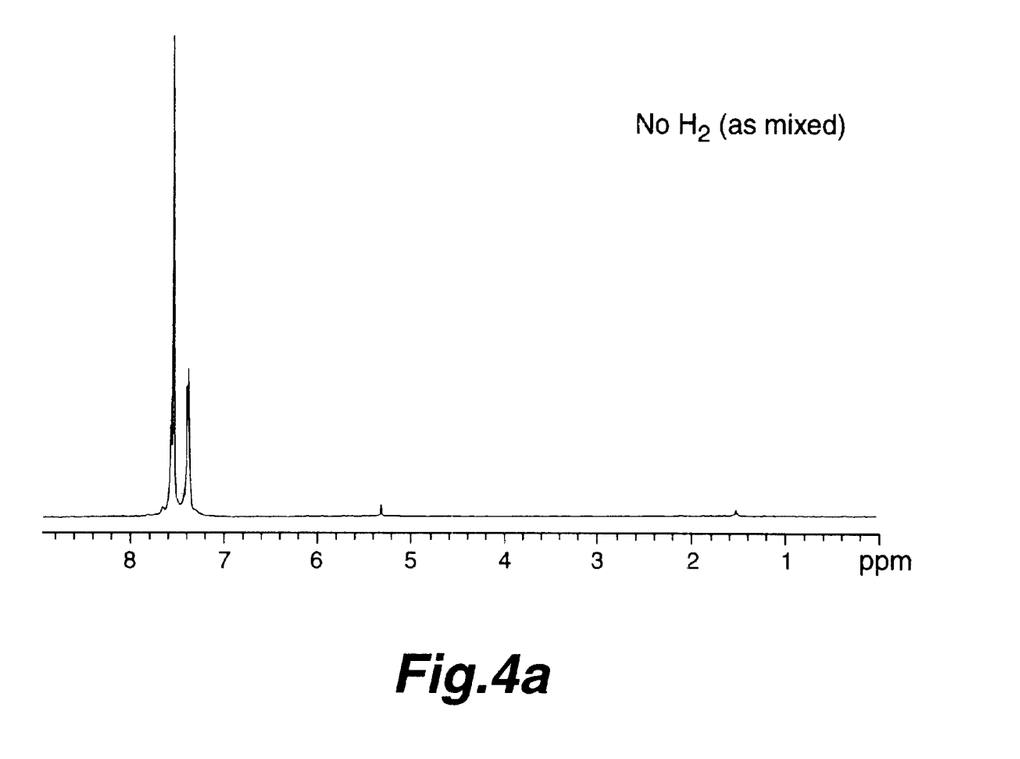
FIG. 4a is a proton NMR spectra of a commercially available hydrogen scavenger prior to exposure to hydrogen.

FIG. 4a is a proton NMR spectra of a commercially available hydrogen scavenger prior to exposure to pure hydrogen.

Figure 4B:
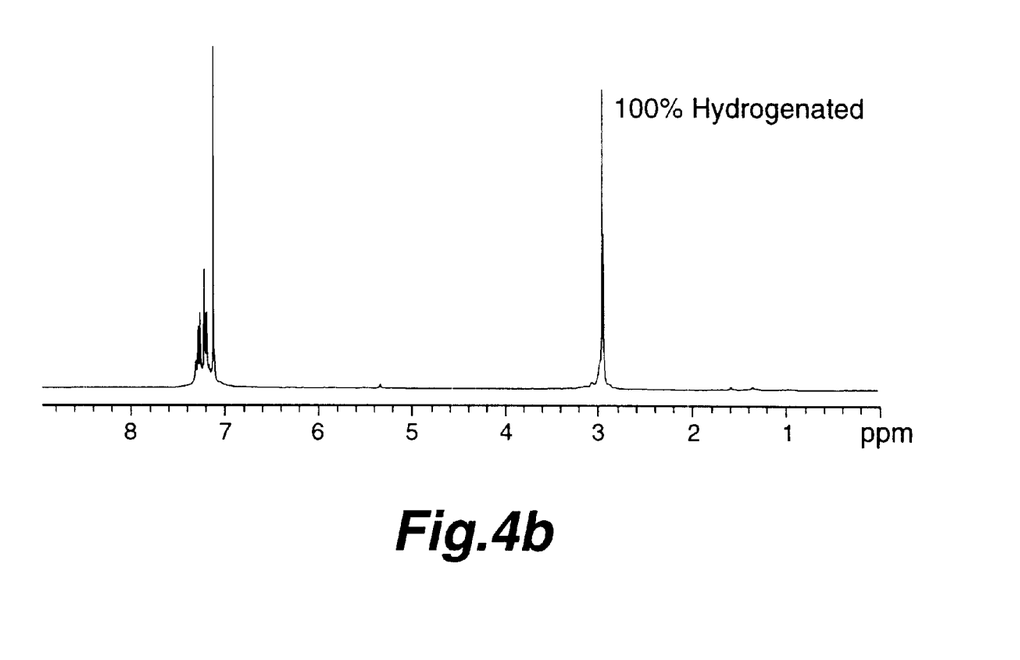
FIG. 4b is a proton NMR spectra of a commercially available hydrogen scavenger after to exposure to hydrogen.

FIG. 4b is a proton NMR spectra of a commercially available hydrogen scavenger after to exposure to pure hydrogen for a period of 12 hours at ambient temperature and pressure.

Figure 5A:
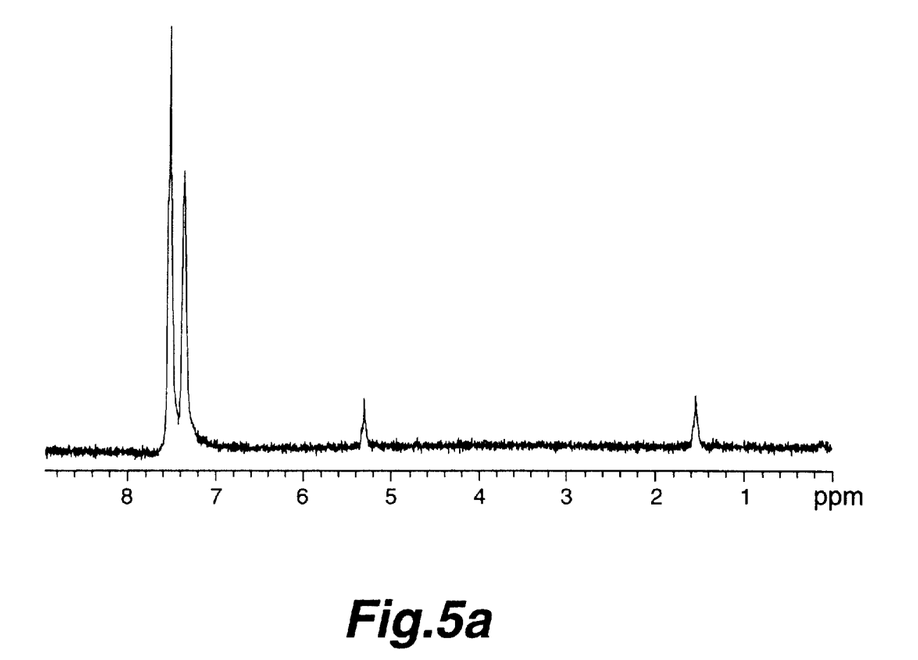
FIG. 5a is a proton NMR spectra of an invention hydrogen scavenger prior to exposure to hydrogen.

FIG. 5a is a proton NMR spectra of an invention hydrogen scavenger prior to exposure to hydrogen for a period of 12 hours at ambient temperature and pressure.

Figure 5B:
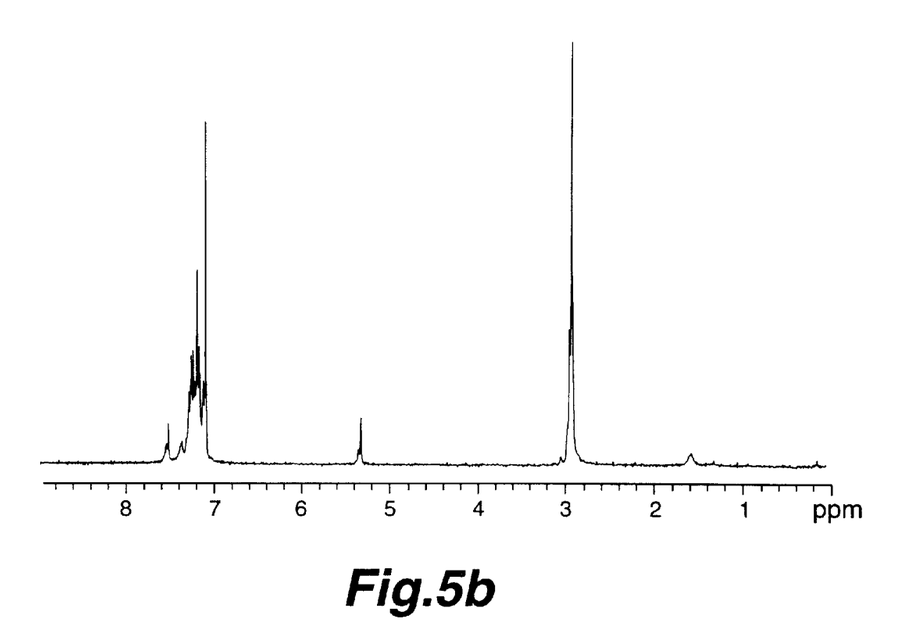
FIG. 5b is a proton NMR spectra of an invention hydrogen scavenger after exposure to hydrogen.

FIG. 5b is a proton NMR spectra of an invention hydrogen scavenger after exposure to hydrogen.

While the compositions, processes and articles of manufacture of this invention have been described in detail for the purpose of illustration, the inventive compositions, processes and articles are not to be construed as limited thereby. This patent is intended to cover all changes and modifications within the spirit and scope thereof Industrial Applicability The hydrogen scavengers of this invention can be employed wherever hydrogen sensitive surfaces or other components require protection from degradation due to hydrogen exposure. Typical applications include microelectronics packaging, systems using explosives and propellants, shipping containers in which hydrogen evolves over time, and fuel storage protection.

What is claimed is:

1. A process for making a hydrogen scavenger comprising:
   (a) combining a vapor of an π-bonded allylic organometallic complex with the vapor of an acetylenic compound to form a vapor mixture;
   (b) irradiating said vapor mixture with UV light to form a mixture of said acetylenic compound vapor and a disassociated π-bonded allylic organometallic complex vapor; and
   (c) allowing said mixture of the acetylenic compound vapor and a disassociated π-bonded allylic organometallic complex vapor to condense on a substrate.

2. The process of claim 1 wherein said π-bonded allylic organometallic complex is prepared by:
   (a) combining an allylic transition metal halide with an anhydrous solvent to form a suspension;
   (b) combining said suspension with an alkali metal complexed with an organic ligand to obtain a reaction mixture having therein a π-bonded allylic organometallic complex and an alkaline earth halide; and
   (c) isolating said π-bonded allylic organometallic complex from said reaction mixture.

3. The process of claim 2 wherein said allylic transition metal halide is one which forms a π-bonded allylic organometallic complex when combined with an alkali metal such as lithium, sodium or potassium complexed with an organic ligand.

4. The process of claim 3 wherein said allylic transition metal halide is one selected from the group of dimeric allylpalladium chloride, allytitanium chloride and allylnickel chloride.

5. The process of claim 4 wherein said allylic transition metal halide is dimeric allylpalladium chloride.

6. The process of claim 2 wherein the concentration of said allylic transition metal halide is in the range from about 0.5 molar to about 2.0 molar.

7. The process of claim 2 wherein in step (b) said suspension is combined with said alkali metal complexed with an organic ligand by sequential additions of said alkali metal complex into said allylic metal halide suspension.

8. The process of claim 2 wherein said alkali metal complexed with an organic ligand is one selected from the group of lithium, sodium, potassium or cesium.

9. The process of claim 2 wherein said organic ligand is an unsaturated ring compound with four to eight carbons.

10. The process of claim 2 wherein said organic ligand is an unsaturated chain compound with three to seven carbons.

11. The process of claim 2 wherein said organic ligand is one selected from the group of cyclobutadiene, cyclopentadiene, 1,3-cyclohexadine, cycloheptene, propene and butene.

12. The process of claim 2 wherein said alkali metal complex is one selected from the group of cyclopentadienyl-lithium, allyl-lithium, sodium cyclopentadienyl, allyl-sodium, potassium cyclopentadienyl, and allyl-potassium.

13. The process of claim 12 wherein said alkali metal complex is cyclopentadienyl-lithium.

14. The process of claim 1 wherein said π-bonded allylic organometallic complex is present in an amount sufficient to combine stochiometrically with said acetylenic compound.

15. The process of claim 14 wherein said π-bonded allylic organometallic complex is present in an amount in the range from about 10 to about 50 weight percent based on total weight of said π-bonded allylic organometallic complex and said acetylenic compound.

16. The process of claim 1 wherein said π-bonded allylic organometallic complex is dimeric allylpalladium chloride.

17. The process of claim 1 wherein said acetylenic compound contains at least one unsaturated carbon-carbon triple bond bonded to at least one unsaturated aromatic ring.

18. The process of claim 1 wherein said acetylenic compound is one selected from the group of: 1,4-bis (phenylethynyl)benzene (DEB), 1,4-diphenylbutadiyne (PB), 1,3-diphenoxybenzene (DPPE), tolyl, xylyl, mesityl, phenyethyl, methylphenylethyl, napthyl, and biphenyl.

19. The process of claim 10 wherein said acetylenic compound is 1,4-bis(phenylethynyl)benzene.

20. The process of claim 1 wherein said vapor of said allylic organometallic complex and said vapor of said acetylenic compound are present in a ratio of amounts which will react stoichiometrically.

21. The process of claim 1 wherein said vapor of said acetylenic compound is present in an amount in the range from about 50 to about 90 weight percent based on total weight of said allylic organometallic complex and said vapor of said acetylenic compound.

22. The process of claim 1 wherein said allylic organometallic complex and said acetylenic compound are each vaporized by sublimation at a temperature slightly below the melting point and at a pressure in the range from about $1\times10^{-4}$ Torr to atmospheric pressure.

23. The process of claim 22 wherein said pressure is about 10 Torr.

24. The process of claim 1 wherein said vapor of said allylic organometallic complex and said vapor of said acetylenic compound are each transported by an inert gas into a common conduit into a deposition chamber.

25. The process of claim 1 wherein said vapor mixture is contacted with said UV light in a deposition chamber containing said substrate.

26. The process of claim 25 wherein said vapor of said allylic organometallic complex and said vapor of said acetylenic compound are introduced into said deposition chamber at a flow rate in the range from about 5 sccm to about 8000 sccm.

27. The process of claim 26 wherein said vapor of said allylic organometallic complex is introduced into said deposition chamber at a flow rate in the range from about 150 to about 250 sccm and said vapor of said acetylenic compound is introduced into said deposition chamber at a flow rate in the range from about 50 sccm to about 150 sccm.

28. The process of claim 1 wherein said UV light has a wavelength in the range from about 200 nm to about 280 nm.

29. The process of claim 28 wherein said UV light has a wavelength of 254 nm.

30. The process of claim 1 wherein said mixture of vapors is contacted by said UV light for a period of time in the range from about 1 minute to about 8 days.

31. The process of claim 30 wherein said mixture of vapors is contacted by said UV light for a period of time in the range from about one-half hour to about 5 hours.

32. The process of claim 1 wherein said substrate is one selected from the group of metals, glasses, ceramics, and polymers.

33. The process of claim 1 wherein said substrate has a complex shape.

34. The process of claim 1 wherein said substrate is made of a porous material.

35. The process of claim 1 wherein said substrate is a foam.

36. The process of claim 1 wherein said disassociated mixture condenses on said substrate in such a manner as to form a layer from about 200 angstroms to about 2000 microns thick.

37. The process of claim 1 wherein step (c) is carried out at atmospheric pressure.

38. The process of claim 1 wherein step (c) is carried out at a temperature in the range from about −50° C. to about 150° C.

39. The process of claim 38 wherein step (c) is carried out at ambient temperature.

* * * * *